United States Patent
Ho et al.

(10) Patent No.: US 10,213,747 B2
(45) Date of Patent: Feb. 26, 2019

(54) MEMBRANES FOR GAS SEPARATION

(71) Applicant: Ohio State Innovation Foundation, Columbus, OH (US)

(72) Inventors: W. S. Winston Ho, Columbus, OH (US); Witopo Salim, Columbus, OH (US); Varun Vakharia, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 46 days.

(21) Appl. No.: 15/254,242

(22) Filed: Sep. 1, 2016

(65) Prior Publication Data

US 2017/0056839 A1    Mar. 2, 2017

Related U.S. Application Data (60) Provisional application No. 62/212,699, filed on Sep. 1, 2015.

(51) Int. Cl.
*B01D 53/22* (2006.01)
*B01D 67/00* (2006.01)
(Continued)

(52) U.S. Cl.
CPC ......... *B01D 69/142* (2013.01); *B01D 53/228* (2013.01); *B01D 67/0006* (2013.01);
(Continued)

(58) Field of Classification Search
CPC .. B01D 53/228; B01D 67/0006; B01D 69/02; B01D 69/10; B01D 69/142; B01D 71/28;
(Continued)

(56) References Cited

U.S. PATENT DOCUMENTS

| 4,165,248 A | 8/1979 | Darlington et al. |
| 4,750,918 A * | 6/1988 | Sirkar .................... B01D 53/22 |
| | | 423/229 |

(Continued)

FOREIGN PATENT DOCUMENTS

WO    2010094923 A2    8/2010

OTHER PUBLICATIONS

U.S. Patent and Trademark Office. International Search Report and Written Opinion. International Application No. PCT/US2016/049868, dated Nov. 10, 2016. 9 pages.

(Continued)

*Primary Examiner* — Jason M Greene
(74) *Attorney, Agent, or Firm* — Meunier Carlin & Curfman LLC (57) ABSTRACT

Membranes, methods of making the membranes, and methods of using the membranes are described. The membranes can comprise a support layer, and a selective polymer layer disposed on the support layer. The selective polymer layer can comprise an oxidatively stable carrier dispersed within a hydrophilic polymer matrix. The oxidatively stable carrier can be chosen from a quaternary ammonium hydroxide carrier (e.g., a mobile carrier such as a small molecule quaternary ammonium hydroxide, or a fixed carrier such as a quaternary ammonium hydroxide-containing polymer), a quaternary ammonium fluoride carrier (e.g., a mobile carrier such as a small molecule quaternary ammonium fluoride, or a fixed carrier such as a quaternary ammonium fluoride-containing polymer), and combinations thereof. The membranes can exhibit selective permeability to gases. The membranes can selectively remove carbon dioxide and/or hydrogen sulfide from hydrogen and/or nitrogen. Further, the membranes can exhibit oxidative stability at temperatures above 100° C.

31 Claims, 5 Drawing Sheets

(51) Int. Cl.
*B01D 69/02* (2006.01)
*B01D 69/10* (2006.01)
*B01D 69/14* (2006.01)
*B01D 71/28* (2006.01)
*B01D 71/38* (2006.01)
*B01D 71/40* (2006.01)
*B01D 71/70* (2006.01)
*B01D 71/32* (2006.01)

(52) U.S. Cl.
CPC .............. *B01D 69/02* (2013.01); *B01D 69/10* (2013.01); *B01D 71/28* (2013.01); *B01D 71/32* (2013.01); *B01D 71/38* (2013.01); *B01D 71/70* (2013.01); *B01D 2256/16* (2013.01); *B01D 2257/304* (2013.01); *B01D 2257/504* (2013.01); *B01D 2311/16* (2013.01); *B01D 2323/30* (2013.01); *B01D 2325/04* (2013.01); *B01D 2325/30* (2013.01); *B01D 2325/36* (2013.01); *Y02C 10/04* (2013.01); *Y02C 10/06* (2013.01); *Y02C 10/10* (2013.01)

(58) Field of Classification Search
CPC ........ B01D 71/32; B01D 71/38; B01D 71/70; B01D 2256/16; B01D 2257/304; B01D 2257/504; B01D 2311/16; B01D 2323/30; B01D 2325/04; B01D 2325/30; B01D 2325/36
See application file for complete search history.

(56) References Cited

U.S. PATENT DOCUMENTS

| | | | |
|---|---|---|---|
| 4,780,114 A | 10/1988 | Quinn et al. | |
| 5,336,298 A | 8/1994 | Quinn et al. | |
| 6,315,968 B1 | 11/2001 | Quinn et al. | |
| 6,579,331 B1* | 6/2003 | Ho | B01D 53/228 422/211 |
| 8,697,428 B2 | 4/2014 | Saunders et al. | |
| 8,721,770 B2 | 5/2014 | Foo et al. | |
| 2005/0129598 A1 | 6/2005 | Chinn et al. | |
| 2010/0313752 A1* | 12/2010 | Powell | B01D 53/228 95/45 |
| 2012/0031833 A1 | 2/2012 | Ho et al. | |
| 2012/0067209 A1* | 3/2012 | Sandru | B01D 53/228 95/51 |
| 2012/0297976 A1* | 11/2012 | Sano | B01D 53/22 95/47 |
| 2013/0267004 A1* | 10/2013 | Rambo | B01D 53/62 435/182 |
| 2014/0165837 A1* | 6/2014 | Kimura | B01D 53/228 96/12 |
| 2015/0258505 A1* | 9/2015 | Hironaka | B01D 69/02 95/51 |

OTHER PUBLICATIONS

Brennecke, et al., "Ionic Liquids: Innovative Fluids for Chemical Processing", AiChE Journ 47, 2001, 2384-2389.

S. Gu, J. Wang, B. Zhang, R.B. Kaspar, Y. Yan, Hydroxide exchange membranes and ionomers, in: B. Ladewig, S.P. Jiang, Y. Yan, M. Lu (Eds.), Materials for Low Temperature Fuel Cells, Wiley-VCH, New York, 2015, pp. 130-134.

Giguere, et al., "The nature of hydrofluoric acid. A spectroscopic study of the proton-transfer complex $H_3O^+F^-$", J. Am. Chem. Soc. 102, 1980, 5473-5477.

Quinn, et al., "Polyelectrolyte-salt blend membranes for acid gas separations", J. Membr. Sci. 131, 1997, 61-69.

Xiong, et al., "Facilitated Transport in Hydroxide-Exchange Membranes for Post-Combustion CO2 Separation", Chem. Sus. Chem. 7, 2014, 114-116.

Zhao, et al., "CO2-Selective Membranes Containing Sterically Hindered Amines for CO2/H2 Separation", Ind. Eng. Chem. Res., 52 (26), 2013, 8774-8782.

* cited by examiner

MEMBRANES FOR GAS SEPARATION

CROSS-REFERENCE TO RELATED APPLICATIONS

This application claims benefit of U.S. Provisional Application No. 62/212,699, filed Sep. 1, 2015, which is hereby incorporated herein by reference in its entirety.

BACKGROUND

There are numerous industrial processes that produce gas streams containing carbon dioxide, hydrogen sulfide, and hydrogen chloride, or gas streams containing carbon dioxide, nitrogen oxides, and sulfur oxides. It is often desirable to remove one or more of these gases from the other components of the gas streams, such as hydrogen and nitrogen. Selectively permeable polymeric membranes have been investigated for a variety of gas separation applications, including hydrogen purification and carbon dioxide sequestration. However, existing selectively permeable polymeric membranes are readily oxidized when contacted with air (e.g., such as a sweep gas) at elevated temperatures. As a consequence, existing membranes are unsuitable for many applications. Thus, there remains a need in the art for membranes, methods of making membranes, and methods of separating gases.

SUMMARY

Membranes, methods of making the membranes, and methods of using the membranes are described herein. The membranes can comprise a support layer, and a selective polymer layer disposed on the support layer. The selective polymer layer can comprise an oxidatively stable carrier dispersed within a hydrophilic polymer matrix. The oxidatively stable carrier can comprise a quaternary ammonium hydroxide carrier, a quaternary ammonium fluoride carrier, or a combination thereof. The membranes can exhibit selective permeability to gases. For example, the membranes can be used to selectively remove carbon dioxide and/or hydrogen sulfide from hydrogen and/or nitrogen. Further, the membranes can exhibit oxidative stability at temperatures above 100° C. As such, the membranes can be compatible with the use of air as a sweep gas at temperatures above 100° C.

The support layer can comprise a gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone or polysulfone. In certain cases, the support layer can comprise a gas permeable polymer disposed on a base (e.g., a nonwoven fabric such as a polyester nonwoven).

The selective polymer layer can comprise an oxidatively stable carrier dispersed within a hydrophilic polymer matrix. The oxidatively stable carrier can be chosen from a quaternary ammonium hydroxide carrier, a quaternary ammonium fluoride carrier, and combinations thereof. The oxidatively stable carrier can comprise a mobile carrier (e.g., a small molecule having a molecular weight of 600 Daltons or less, such as a small molecule quaternary ammonium hydroxide and/or a small molecule quaternary ammonium fluoride), a fixed carrier (e.g., a polymeric carrier such as a quaternary ammonium hydroxide-containing polymer and/or a quaternary ammonium fluoride-containing polymer), or a combination thereof. In certain embodiments, the oxidatively stable carrier can comprise one or more mobile carriers (e.g., one or more small molecule quaternary ammonium hydroxides, one or more small molecule quaternary ammonium fluorides, or a blend of one or more small molecule quaternary ammonium hydroxides and one or more small molecule quaternary ammonium fluorides). In certain embodiments, the oxidatively stable carrier can comprise one or more fixed carriers (e.g., one or more quaternary ammonium hydroxide-containing polymers, one or more quaternary ammonium fluoride-containing polymers, or a blend of one or more quaternary ammonium hydroxide-containing polymers and one or more quaternary ammonium fluoride-containing polymers).

In certain embodiments, the oxidatively stable carrier can comprise one or more mobile carriers (e.g., one or more small molecule quaternary ammonium hydroxides, one or more small molecule quaternary ammonium fluorides, or a blend of one or more small molecule quaternary ammonium hydroxides and one or more small molecule quaternary ammonium fluorides) and one or more fixed carriers (e.g., one or more quaternary ammonium hydroxide-containing polymers, one or more quaternary ammonium fluoride-containing polymers, or a blend of one or more quaternary ammonium hydroxide-containing polymers and one or more quaternary ammonium fluoride-containing polymers).

The quaternary ammonium hydroxide carrier can be chosen from a small molecule quaternary ammonium hydroxide, a quaternary ammonium hydroxide-containing polymer, and combinations thereof. In some cases, the oxidatively stable carrier can comprise a small molecule quaternary ammonium hydroxide chosen from tetramethylammonium hydroxide, tetraethylammonium hydroxide, tetrapropylammonium hydroxide, tetrabutylammonium hydroxide, and combinations thereof. In some cases, the oxidatively stable carrier can comprise a quaternary ammonium hydroxide-containing polymer chosen from poly(diallyldimethyl-ammonium hydroxide), poly(vinylbenzyltrimethylammonium hydroxide), poly(2-vinyl-1-methylpyridinium hydroxide), poly(acrylamide-N-propyltrimethylammonium hydroxide), poly(2-methacryloxyethyltrimethylammonium hydroxide), poly(3-chloro-2-hydroxypropyl-2-methacryloxyethyldimethylammonium hydroxide), copolymers thereof, and blends thereof.

The quaternary ammonium fluoride carrier can be chosen from a small molecule quaternary ammonium fluoride, a quaternary ammonium fluoride-containing polymer, and combinations thereof. In some cases, the oxidatively stable carrier can comprise a small molecule quaternary ammonium fluoride chosen from tetramethylammonium fluoride, tetraethylammonium fluoride, tetrapropylammonium fluoride, tetrabutylammonium fluoride, cesium fluoride, potassium fluoride, sodium fluoride, lithium fluoride, and combinations thereof. In some cases, the oxidatively stable carrier can comprise a quaternary ammonium fluoride-containing polymer chosen from poly(diallyldimethyl-ammonium fluoride), poly(vinylbenzyltrimethylammonium fluoride), poly(2-vinyl-1-methylpyridinium fluoride), poly(acrylamide-N-propyltrimethylammonium fluoride, poly(2-methacryloxyethyltrimethylammonium fluoride), poly(3-chloro-2-hydroxypropyl-2-methacryloxyethyldimethylammonium fluoride), copolymers thereof, and blends thereof.

The hydrophilic polymer matrix can comprise a crosslinked hydrophilic polymer. In some cases the hydrophilic polymer matrix can comprise a polymer selected from the group consisting of polyvinyl alcohol, polyvinyl acetate, polyalkylene oxides such as polyethylene oxide, polyvinylpyrrolidone, polysiloxanes, copolymers thereof, and blends thereof. In some cases, the hydrophilic polymer matrix can comprise polyvinyl alcohol. In some cases, the hydrophilic polymer matrix can comprise polyvinyl alcohol-polysiloxane.

Optionally, the membrane can include one or more additional layers. For example, in some embodiments, the membrane can further comprise a permeable layer disposed between the support layer and the selective polymer layer. In some embodiments, the membrane can further comprise a permeable layer disposed on the selective polymer layer. When present, the permeable layer(s) can comprise a gas permeable polymer chosen from poly(dimethylsiloxane), poly(trimethylsilylpropyne), poly(4-methyl-1-pentene), copolymers thereof, and blends thereof.

Also provided are methods for making and using the membranes described herein. For example, provided are methods for separating a first gas from a feed gas comprising the first gas and one or more additional gases (e.g., at least a second gas). The method can include contacting any of the disclosed membranes with the feed gas under conditions effective to afford transmembrane permeation of the first gas.

DETAILED DESCRIPTION

Membranes, methods of making the membranes, and methods of using the membranes are described herein. The membranes can comprise a support layer, and a selective polymer layer disposed on the support layer. The selective polymer layer can comprise an oxidatively stable carrier dispersed within a hydrophilic polymer matrix. The oxidatively stable carrier can comprise a quaternary ammonium hydroxide carrier, a quaternary ammonium fluoride carrier, or a combination thereof. The membranes can exhibit selective permeability to gases. For example, the membranes can be used to selectively remove carbon dioxide and/or hydrogen sulfide from hydrogen and/or nitrogen. Further, the membranes can exhibit oxidative stability at temperatures above 100° C. As such, the membranes can be compatible with the use of air as a sweep gas at temperatures above 100° C.

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, partially fluorinated or perfluorinated derivatives thereof, copolymers thereof, or blends thereof. In some embodiments, the gas permeable polymer can be polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

The membranes can further include a selective polymer layer disposed on the support layer. In some cases, the selective polymer layer can be a selective polymer through which gas permeates via diffusion or facilitated diffusion. The selective polymer layer can comprise a selective polymer having a $CO_2$:$H_2$ selectivity of at least 20 at 120° C. For example, the selective polymer can have a $CO_2$:$H_2$ selectivity of at least 25 at 120° C. (e.g., at least 50 at 120° C., at least 75 at 120° C., at least 100 at 120° C., at least 125 at 120° C., at least 150 at 120° C., at least 175 at 120° C., at least 200 at 120° C., or at least 225 at 120° C.). In some embodiments, the selective polymer can comprise a selective polymer that has a $CO_2$:$H_2$ selectivity of 250 or less at 120° C. In certain embodiments, the selective polymer can comprise a selective polymer that has a $CO_2$:$H_2$ selectivity ranging from any of the minimum values described above to any of the maximum values described above. For example, in certain embodiments, the selective polymer can comprise a selective polymer that has a $CO_2$:$H_2$ selectivity of from 20 to 250 at 120° C. (e.g., from 25 to 250 at 120° C., from 50 to 200 at 120° C., or from 75 to 150 at 120° C.). The $CO_2$:$H_2$ selectivity of the selective polymer can be measured using standard methods for measuring gas permeance known in the art, such as those described in the examples below.

The selective polymer layer can comprise an oxidatively stable carrier dispersed within a hydrophilic polymer matrix. The oxidatively stable carrier can be chosen from a quaternary ammonium hydroxide carrier, a quaternary ammonium fluoride carrier, and combinations thereof. The oxidatively stable carrier can comprise a mobile carrier (e.g., a small molecule, such as a small molecule quaternary ammonium hydroxide and/or a small molecule quaternary ammonium fluoride), a fixed carrier (e.g., a polymer such as a quaternary ammonium hydroxide-containing polymer and/or a quaternary ammonium fluoride-containing polymer), or a combination thereof. In certain embodiments, the oxidatively stable carrier can comprise one or more mobile carriers (e.g., one or more small molecule quaternary ammonium hydroxides, one or more small molecule quaternary ammonium fluorides, or a blend of one or more small molecule quaternary ammonium hydroxides and one or more small molecule quaternary ammonium fluorides). In certain embodiments, the oxidatively stable carrier can comprise one or more fixed carriers (e.g., one or more quaternary ammonium hydroxide-containing polymers, one or more quaternary ammonium fluoride-containing polymers, or a blend of one or more quaternary ammonium hydroxide-containing polymers and one or more quaternary ammonium fluoride-containing polymers).

In certain embodiments, the oxidatively stable carrier can comprise one or more mobile carriers (e.g., one or more small molecule quaternary ammonium hydroxides, one or more small molecule quaternary ammonium fluorides, or a blend of one or more small molecule quaternary ammonium hydroxides and one or more small molecule quaternary ammonium fluorides) and one or more fixed carriers (e.g., one or more quaternary ammonium hydroxide-containing polymers, one or more quaternary ammonium fluoride-containing polymers, or a blend of one or more quaternary ammonium hydroxide-containing polymers and one or more quaternary ammonium fluoride-containing polymers).

The term "small molecule", as used herein, refers to a molecule, such as an organic compound, with a molecular weight of less than about 1,000 Daltons (e.g., less than about 800 Daltons, less than about 750 Daltons, less than about 600 Daltons, or less than about 500 Daltons).

In some cases, the quaternary ammonium hydroxide carrier can be chosen from a small molecule quaternary ammonium hydroxide, a quaternary ammonium hydroxide-containing polymer, and combinations thereof. In some cases, the oxidatively stable carrier can comprise a small molecule quaternary ammonium hydroxide. Suitable examples of small molecule quaternary ammonium hydroxides include, but are not limited to, tetramethylammonium hydroxide, tetraethylammonium hydroxide, tetrapropylammonium hydroxide, tetrabutylammonium hydroxide, and combinations thereof. In some cases, the oxidatively stable carrier can comprise a quaternary ammonium hydroxide-containing polymer. The quaternary ammonium hydroxide-containing polymer can have any suitable molecular weight. For example, the quaternary ammonium hydroxide-containing polymer can have a weight average molecular weight of from 5,000 Da to 2,000,000 Da, or from 50,000 Da to 200,000 Da. Suitable examples of quaternary ammonium hydroxide-containing polymers include, but are not limited to, poly(diallyldimethyl-ammonium hydroxide), poly(vinylbenzyltrimethylammonium hydroxide), poly(2-vinyl-1-methylpyridinium hydroxide), poly(acrylamide-N-propyltrimethylammonium hydroxide), poly(2-methacryloxyethyltrimethylammonium hydroxide), poly(3-chloro-2-hydroxypropyl-2-methacryloxyethyldimethylammonium hydroxide), copolymers thereof, and blends thereof. In some embodiments when the oxidatively stable carrier comprises a quaternary ammonium hydroxide-containing polymer, the hydrophilic polymer is absent from the selective polymer layer. In some embodiments when the oxidatively stable carrier compound comprises a quaternary ammonium hydroxide-containing polymer, the selective polymer layer can comprise a blend of a quaternary ammonium hydroxide-containing polymer and a hydrophilic polymer (e.g., a quaternary ammonium hydroxide-containing polymer dispersed in a hydrophilic polymer matrix).

In some embodiments when the oxidatively stable carrier comprises a quaternary ammonium hydroxide-containing polymer, the selective polymer layer can comprise a blend of a quaternary ammonium hydroxide-containing polymer, one or more additional oxidatively stable carriers (e.g., a small molecule quaternary ammonium hydroxide, small molecule quaternary ammonium fluoride, a quaternary ammonium fluoride-containing polymer, or a combination thereof) and a hydrophilic polymer (e.g., a quaternary ammonium hydroxide-containing polymer and one or more additional oxidatively stable carriers dispersed in a hydrophilic polymer matrix).

In some cases, the quaternary ammonium fluoride carrier can be chosen from a small molecule quaternary ammonium fluoride, a quaternary ammonium hydroxide-fluoride polymer, and combinations thereof. In some cases, the oxidatively stable carrier can comprise a small molecule quaternary ammonium fluoride. Suitable examples of small molecule quaternary ammonium fluorides include, but are not limited to, tetramethylammonium fluoride, tetraethylammonium fluoride, tetrapropylammonium fluoride, tetrabutylammonium fluoride, and combinations thereof, as well as small molecule quaternary ammonium fluoride analogs such as cesium fluoride, potassium fluoride, sodium fluoride, lithium fluoride, and combinations thereof. In some cases, the oxidatively stable carrier can comprise a quaternary ammonium fluoride-containing polymer. The quaternary ammonium fluoride-containing polymer can have any suitable molecular weight. For example, the quaternary ammonium fluoride-containing polymer can have a weight average molecular weight of from 5,000 Da to 2,000,000 Da, or from 50,000 Da to 200,000 Da. Suitable examples of quaternary ammonium fluoride-containing polymers include, but are not limited to, poly(diallyldimethyl-ammonium fluoride), poly(vinylbenzyltrimethylammonium fluoride), poly(2-vinyl-1-methylpyridinium fluoride), poly(acrylamide-N-propyltrimethylammonium fluoride, poly(2-methacryloxyethyltrimethylammonium fluoride), poly(3-chloro-2-hydroxypropyl-2-methacryloxyethyldimethylammonium fluoride), copolymers thereof, and blends thereof. In some embodiments when the oxidatively stable carrier comprises a quaternary ammonium fluoride-containing polymer, the hydrophilic polymer is absent from the selective polymer layer. In some embodiments when the oxidatively stable carrier compound comprises a quaternary ammonium fluoride-containing polymer, the selective polymer layer can comprise a blend of a quaternary ammonium fluoride-containing polymer and a hydrophilic polymer (e.g., a quaternary ammonium fluoride-containing polymer dispersed in a hydrophilic polymer matrix).

In some embodiments when the oxidatively stable carrier comprises a quaternary ammonium fluoride-containing polymer, the selective polymer layer can comprise a blend of a quaternary ammonium fluoride-containing polymer, one or more additional oxidatively stable carriers (e.g., a small molecule quaternary ammonium hydroxide, small molecule quaternary ammonium fluoride, a quaternary ammonium hydroxide-containing polymer, or a combination thereof) and a hydrophilic polymer (e.g., a quaternary ammonium fluoride-containing polymer and one or more additional oxidatively stable carriers dispersed in a hydrophilic polymer matrix).

The selective polymer layer can comprise any suitable amount of the oxidatively stable carrier. The amount of oxidatively stable carrier can depend on a number of factors, including the identity of the oxidatively stable carrier and the intended application for the membrane. For example, in some embodiments, the hydrophilic polymer can be absent. In these embodiments, the selective polymer layer can comprise from 100% to 80% by weight oxidatively stable carrier, based on the total weight of the components used to form the selective polymer layer. In these cases, the oxidatively stable carrier(s) present in the selective layer include at least one fixed carrier (e.g., a quaternary ammonium hydroxide-containing polymer and/or a quaternary ammonium fluoride-containing polymer). In some cases, the selective polymer layer can comprise from 10% to 90% by weight (e.g., from 10% to 50% by weight) oxidatively stable carrier, based on the total weight of the components used to form the selective polymer layer.

Optionally, the selective polymer layer can include any suitable hydrophilic polymer. Examples of hydrophilic polymers suitable for use in the selective polymer layer can include polyvinylalcohol, polyvinylacetate, polyalkylene oxides such as polyethylene oxide, polyvinylpyrrolidone, copolymers thereof, and blends thereof. In some cases, the hydrophilic polymer matrix can comprise a crosslinked hydrophilic polymer. In some cases, the hydrophilic polymer matrix can comprise polyvinyl alcohol. In some cases, the hydrophilic polymer matrix can comprise polyvinyl alcohol-polysiloxane.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinyl alcohol having a weight average molecular weight of from 50,000 Da to 150,000 Da.

The selective polymer layer can comprise any suitable amount of the hydrophilic polymer. For example, in some cases, the selective polymer layer can comprise from 10% to 90% by weight (e.g., from 10% to 50% by weight) hydrophilic polymer, based on the total weight of the components used to form the selective polymer layer.

In some embodiments, the selective polymer can also include a cross-linking agent. Cross-linking agents suitable for use in the selective polymer can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer can comprise any suitable amount of the cross-linking agent. For example, the selective polymer can comprise 1 to 40 percent cross-linking agents by weight of the selective polymer.

The selective polymer layer can further include a base. The base can act as a catalyst to catalyze the cross-linking of the selective polymer layer (e.g., cross-linking of a hydrophilic polymer with an amine-containing polymer). In some embodiments, the base can remain in the selective polymer and constitute a part of the selective polymer. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer can comprise any suitable amount of the base. For example, the selective polymer can comprise 1 to 40 percent base by weight of the selective polymer If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

Optionally, the membrane can include one or more additional layers. For example, in some embodiments, the membrane can further comprise a permeable layer disposed between the support layer and the selective polymer layer. In some embodiments, the membrane can further comprise a permeable layer disposed on the selective polymer layer. When present, the permeable layer(s) can comprise a gas permeable polymer chosen from poly(dimethylsiloxane), poly(trimethylsilylpropyne), poly(4-methyl-1-pentene), copolymers thereof, and blends thereof.

The total thickness of each layer in the membrane can be chosen such that the structure is mechanically robust, but not so thick as to impair permeability. In some embodiments, the selective layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Methods of making the membranes are also disclosed herein. Methods of making membranes can include depositing a selective polymer layer on a support layer to form an selective layer disposed on the support layer, wherein the selective polymer layer comprises an oxidatively stable carrier dispersed within a hydrophilic polymer matrix, and wherein the oxidatively stable carrier is chosen from a quaternary ammonium hydroxide carrier, a quaternary ammonium fluoride carrier, and combinations thereof Optionally, the support layer can be pretreated prior to deposition of the selective layer, for example, to remove water or other adsorbed species using methods appropriate to the support and the adsorbate. Examples of absorbed species are, for example, water, alcohols, porogens, and surfactant templates.

The selective polymer can be prepared by first forming a casting solution of a hydrophilic polymer (when present), an oxidatively stable carrier, and optionally a cross-linking agent and a basic compound in a suitable solvent. One example of a suitable solvent is water. In some embodiments, the amount of water employed will be in the range of from 50% to 99%, by weight of the casting solution. The casting solution can then be used in forming a nonporous selective polymer membrane. The selective polymer can be formed into a nonporous membrane by using any suitable techniques. For example, the casting solution can be cast onto a substrate using any suitable techniques, and the solvent may be evaporated such that a nonporous membrane is formed on the substrate. Examples of suitable casting techniques include, but are not limited to, "knife casting" or "dip casting". Knife casting include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip casting include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from selective polymers containing for example, the hydrophilic polymer, the cross-linking agent, the base, and the oxidatively stable carrier in a suitable solvent can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be cast onto the support layer and the solvent evaporated, as discussed above. In some embodiments, a higher degree of cross-linking for the selective polymer after solvent removal takes place at about 100° C. to about 180° C., and the cross-linking occurs in from about 1 to about 72 hours.

An additive may be included in the selective polymer before forming the selective layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making the membrane can be scaled to industrial levels.

The membranes disclosed herein can be used for separating gaseous mixtures. For example, provided are methods for separating a first gas from a feed gas comprising the first gas and one or more additional gases (e.g., at least a second gas). The method can include contacting any of the disclosed membranes (e.g., on the side comprising the selective polymer) with the feed gas under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, the membrane can be used at temperatures of from 100° C. to 180° C. In some embodiments, a vacuum can be applied to the permeate face of the membrane to remove the first gas. In some embodiments, a sweep gas can be flowed across the permeate face of the membrane to remove the first gas. The sweep gas can comprise air. Because of the oxidative stability of the carrier in the membranes discloses herein, air can be used as a sweep gas at temperatures above 100° C. Under these conditions, the membranes are stable, as indicated by the membrane exhibiting less than a 10% change (e.g., less than a 5% change) in $CO_2/H_2$ selectivity over 145 hours of use at 120° C. with air as a sweep gas.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, carbon monoxide, or combinations thereof. In some embodiments, the membrane can be selective to hydrogen sulfide versus hydrogen, nitrogen, carbon monoxide, or combinations thereof. In some embodiments, the membrane can be selective to hydrochloric acid gas versus hydrogen, nitrogen, carbon monoxide, or combinations thereof. In some embodiments, the acid gas may be derived from fossil fuels that require hydrogen purification for fuel cell, electricity generation, and hydrogenation applications, biogas for renewable energy, and natural gas for commercial uses. For example, the membranes may be employed in a fuel cell (e.g., to purify feed gases prior to entering the fuel cell. The membranes can also be used for removal of carbon dioxide from flue gas.

The permeance of the first gas or the acid gas can be at least 50 GPU at 120° C. In some embodiments, the permeance of the first gas or the acid gas through the membranes can be up to 500 GPU at 120° C. For example, the permeance of the first gas or the acid gas through the membranes can be 50 GPU or greater, 75 GPU or greater, 100 GPU or greater, 150 GPU or greater, 200 GPU or greater, 250 GPU or greater, or 500 GPU or greater at 120° C. The membrane can exhibit a first gas:second gas selectivity of at least 20 at 120° C. In some embodiments, the membrane can exhibit a first gas:second gas selectivity of up to 250 at 120° C. For example, the membrane can exhibit a first gas:second gas selectivity of 25 or greater, 50 or greater, 75 or greater, 100 or greater, 125 or greater, 200 or greater, 225 or greater, or 250 or greater at 120° C. In some embodiments, the permeance and selectivity of the membrane for the first gas or the acid gas can vary at higher or lower temperatures.

By way of non-limiting illustration, examples of certain embodiments of the present disclosure are given below.

EXAMPLES

Natural gas and other carbonaceous feedstocks including coal and biomass are the main sources of energy and have been used to produce reformed gas, also known as synthesis gas or syngas. Syngas is a fuel gas mixture that includes hydrogen, carbon monoxide, carbon dioxide, and hydrogen sulfide. If desired, syngas can be mixed with steam to enrich the mixture with more hydrogen and carbon dioxide during the water-gas-shift (WGS) reaction step. This can improve the utility of syngas as a hydrogen feedstock. However, removal of carbon dioxide and hydrogen sulfide is needed in order to produce high-purity hydrogen for use in fuel cells and petrochemical processes. Removal of carbon dioxide and hydrogen sulfide is also needed for purification of natural gas. As usage of hydrogen and natural gas is increasing, the need for their purification is also increasing. In addition, $CO_2$ capture including from flue gas in power plants is also needed for its sequestration and use in enhanced oil recovery.

Compared to the existing commercial separation processes for the removal of carbon dioxide and hydrogen sulfide, such as absorption, adsorption and cryogenic distillation, a membrane process has the advantages of energy efficiency, compact spacing, simple operation and maintenance, and low capital cost. A membrane process has the same advantages for $CO_2$ capture. Amine-based membranes have been developed that can be used for $H_2$ purification; however, the oxidation of amines by oxygen in the air at high temperatures (>100° C.) has prevented the use of air as the sweep gas. For certain applications of gas separations including $H_2$ purification, it is desirable to utilize air as the sweep gas in the membrane process. Hence, the development of an oxidatively stable membrane for such applications is required.

Experimental Methods

Quaternaryammonium hydroxide- and fluoride-containing polymers were prepared by ion-exchange of quaternaryammonium halide-containing polymers with potassium hydroxide (KOH) and potassium fluoride (KF), respectively.

A crosslinked polyvinyl alcohol (PVA) solution was prepared by dissolving PVA S2217 in water in a 250-ml glass conical flask to obtain a 13 wt % solution of PVA. The aqueous PVA solution was heated to 80° C. with continuous stirring for 2 hours. A KOH solution (about 30-40% in water) was then added dropwise to the PVA solution under gentle stirring. The solution was mixed for 30 minutes after the addition of KOH. Subsequently, the PVA crosslinking reaction was initiated by adding a solution of glutaraldehyde (GA) dropwise under vigorous stirring at 80° C. The reaction was allowed to proceed for approximately 2.5 hours, at which point the crosslinking reaction was transferred to a cold stir plate and gently stirred. 100% (molar) crosslinking was targeted. The total solid content in the crosslinked PVA solution was targeted at 15% (12% crosslinked PVA and 3% KOH). In other examples, the aqueous solution of PVA was crosslinked by tetraethylorthosilicate (TEOS) and glutaraldehyde (GA) at a certain molar ratio, such as 40:60, 50:50, and the like. In such cases, the TEOS and HCl solution were added under vigorous stirring prior to the addition of KOH solution and the crosslinking reaction was conducted at 80° C. for 80 minutes.

The coating solution for the membrane synthesis was prepared by adding the oxidatively stable carrier solution dropwise to the calculated amount of the crosslinked PVA solution under stirring in a 50-ml glass beaker. The total solid concentration in the coating solution was required to be low enough to avoid instantaneous gelling of the coating solution. The costing solution was mixed continuously after the addition of the components and then air purged until the desired viscosity was achieved.

A coating solution with a high viscosity was desirable to minimize the penetration of the coating solution into the pores of the support layer. The coating solution with 16% total solid content was centrifuged at 8000 rpm for 3 minutes to remove particulate impurities and air bubbles before it was coated on a flat-sheet nanoporous polysulfone support using a GARDCO adjustable micrometer film applicator (Paul N. Gardner Company, Pompano Beach, Fla.) with a controlled gap setting. The membrane was cured at 120° C. in a convection oven for 6 hours for the complete removal of water and the complete crosslinking reaction of PVA with glutaraldehyde. In other instances, other substrates such as nanoporous polyethersulfone support, Teflon support, and the like can also be used. The thickness of the selective layer was measured by a Mitutoyo electronic indicator (Model 543-252B, Mitutoyo America Corp, Aurora, Ill.) with an accuracy of ±0.5 The selective layer thickness was calculated by subtracting the polymer support thickness from the total thickness of the composite membrane. The thickness of the selective layer was controlled at around 15 unless otherwise noted.

Figure 2:
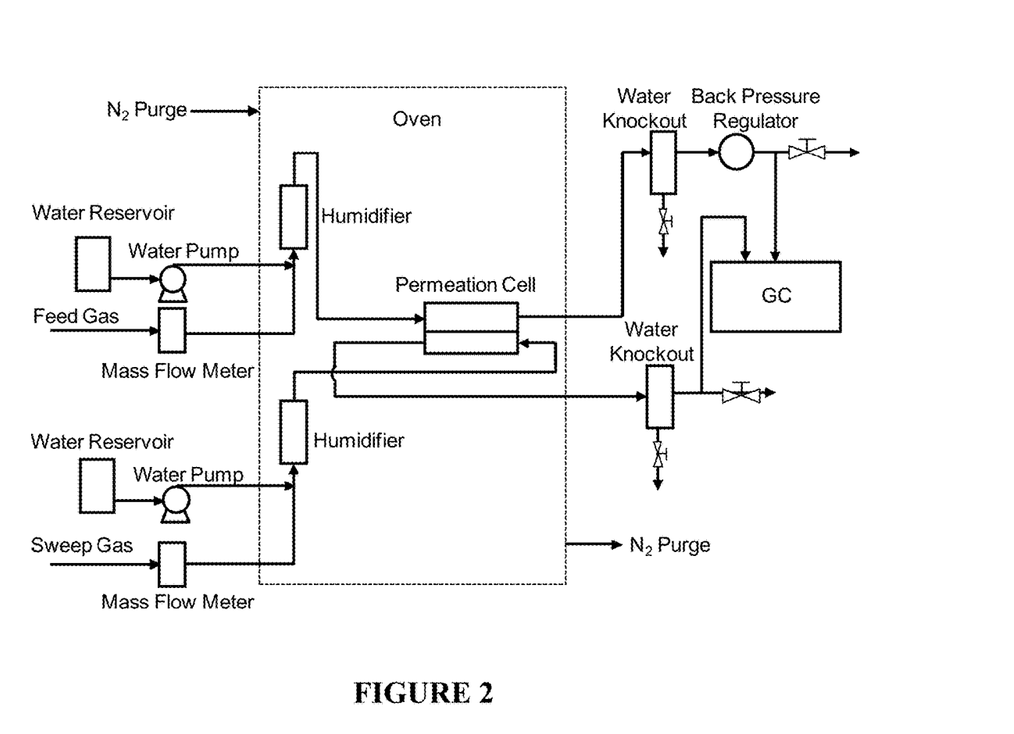
FIG. 2 is a schematic of the gas permeation apparatus used for the gas transport measurements described in the examples herein.

The gas permeation set-up shown schematically in FIG. 2 was used to measure the transport performance of the membranes discussed above. The set-up consisted of mass flow controllers, water pumps and humidifiers to simulate the actual gas compositions in the gas mixture. The membrane to be tested was placed between the upper and lower parts of a rectangular gas permeation cell. The feed and sweep gases entered the cell in a countercurrent configuration at the top and bottom compartments of the permeation cell, respectively. During the testing, the dry feed gas used was 60 cc/min at 1.5 psig, and the dry sweep gas used was 30 cc/min at 1 psig. Both the feed gas and the sweep gas were humidified with water vapor by injecting controlled amounts of water into them to obtain the controlled concentrations of water vapor in them. For composition analysis after the water removal in the knockout vessels, the retentate and permeate streams were directed to the Agilent 6890N (Agilent Tech., Palo Alto, Calif.) gas chromatograph (GC) which is equipped with a stainless steel micropacked column (Supelco, 80/100 mesh, Carboxen 1004, Bellefonte, Calif.) and a thermal conductivity detector (TCD). The membrane surface area of 3.4 $cm^2$ was used for the gas permeation measurements. The membrane performances (permeability $P_i$ and selectivity $\alpha_{ij}$) were evaluated by applying the flux equation using the gas compositions obtained from the GC as follows:

$$P_i = \frac{J_i}{\Delta p_i / \ell}$$

$$\alpha_{ij} = \frac{y_i / y_j}{x_i / x_j}$$

$$\Delta p_i = \frac{(p_{i,feed\ in} - p_{i,sweep\ out}) - (p_{i,feed\ out} - p_{i,sweep\ in})}{\ln(p_{i,feed\ in} - p_{i,sweep\ out}) - \ln(p_{i,feed\ out} - p_{i,sweep\ in})}$$

where i denotes the gas component $CO_2$ and j denotes another gas component ($H_2$, $CH_4$, or $N_2$); y and x are the mole fractions of each gas component in the sweep and feed sides of the membrane, respectively; $J_i$ is the steady-state $CO_2$ molar flux across the selective layer; l is the selective layer thickness; and $\Delta p_i$ is the partial pressure difference between the feed and sweep sides (driving force) for the permeation process, which is determined using the logarithmic mean method.

The common unit of the permeability ($P_i$) is Barrer, which is equal to $10^{-10}$ $cm^3$ (STP) cm/($cm^2$ s cmHg)=$3.35 \times 10^{-16}$ mol m/($m^2$ s Pa)). The ratio of permeability to the selective layer thickness ($P_i$/l) is referred as the permeance and its common unit is the gas permeation unit (GPU), which is equal to $10^{-6}$ $cm^3$ (STP)/($cm^2$ s cmHg).

Example 1: Preparation of Poly(diallyldimethylammonium hydroxide) (PDADMQ-OH)

Poly(diallyldimethylammonium hydroxide) (PDADMQ-OH) was prepared as described above. Dried PDADMQ-Cl was dissolved in 35 g of methanol. 6.47 g of potassium hydroxide (KOH) was then added under vigorous stirring. The ion-exchange reaction of PDADMQ-Cl with KOH to form PDADMQ-OH proceeded at room temperature for 24 hours. The byproduct salt, KCl, precipitated and was removed from the mixture using centrifugation at 8000 rpm for 5 minutes. Before being used for coating solutions for membrane preparation, the PDADMQ-OH solution was air purged to evaporate the solvent and subsequently was re-dissolved in water to obtain a solution of 26.73 wt % of PDADMQ-OH in water.

Example 2: Preparation of Poly(diallyldimethylammonium fluoride) (PDADMQ-F)

Poly(diallyldimethylammonium fluoride) (PDADMQ-F) was prepared as described above. Dried PDADMQ-Cl was dissolved in 30 g of methanol. 1.86 g of potassium fluoride (KF) was then added under vigorous stirring. The ion-exchange reaction of PDADMQ-Cl with KF to form PDADMQ-F proceeded at room temperature for 24 hours. The byproduct salt, KCl, precipitated and was removed from the mixture using centrifugation at 8000 rpm for 5 minutes. Before being used for coating solutions for membrane preparation, the PDADMQ-F solution was air purged to evaporate the solvent and subsequently was re-dissolved in water to obtain a solution of 14.61 wt % of PDADMQ-F in water.

Example 3: Preparation of Poly(vinylbenzyltrimethylammonium fluoride) (PVBTQ-F)

Poly(vinylbenzyltrimethylammonium fluoride) (PVBTQ-F) was prepared as described above. Dried PVBTQ-Cl was dissolved in 30 g of methanol. 1.79 g of potassium fluoride (KF) was then added under vigorous stirring. The ion-exchange reaction of PVBTQ-Cl with KF to form PVBTQ-F proceeded at room temperature for 24 hours. The byproduct salt, KCl, precipitated and was removed from the mixture using centrifugation at 8000 rpm for 5 minutes. Before being used for coating solutions for membrane preparation, the PVBTQ-F solution was air purged to evaporate the solvent and subsequently was re-dissolved in water to obtain 15.92 wt % of PVBTQ-F in water.

Example 4: Preparation of Poly(acrylamidopropyltrimethylammonium hydroxide) (PAPTQ-OH)

The procedure for the preparation of poly(acrylamidopropyltrimethylammonium hydroxide) (PAPTQ-OH) from the monomer, acrylamido propyltrimethylammonium chloride, was as follows. First, one drop of $H_2SO_4$ (98 wt %) was added to 30 g of a 50 wt % aqueous solution of acrylamidopropyltrimethylammonium chloride (APTQ-Cl) to adjust the pH of the solution to around 5.1. Afterwards, one drop of mercaptoethanol was added to the solution, and the mixture was heated to 72° C. The polymerization was conducted at 72° C. for 1 hr after addition of 0.2 g of AIBN (V-50 initiator) to the mixture, as indicated by the gradual increase on the viscosity of the solution.

After the polymerization mixture containing poly(acrylamidopropyltrimethylammonium chloride) (PAPTQ-Cl) was cooled to room temperature, the water in the PAPTQ-Cl aqueous solution was evaporated by air-purging at room temperature, and the remaining sample was dried in a vacuum oven at 102° C. to obtain the dried PAPTQ-Cl. A stoichiometric amount of potassium hydroxide (KOH) solution in methanol was added, and the ion-exchange reaction of PAPTQ-Cl with KOH to form PAPTQ-OH occurred at room temperature for 24 hours. The byproduct salt, KCl, was not soluble in methanol and therefore precipitated and was removed from the solution by centrifugation at 8000 rpm for 5 min. Before being used for coating solutions for membrane preparation, the PAPTQ-QH solution was air purged to evaporate the solvent and was re-dissolved in water to obtain 35.85 wt % of PAPTQ-OH in water.

Example 5: Quaternaryammonium Hydroxide-Containing Membranes

The quaternaryammonium hydroxides were investigated as mobile carriers for the $CO_2$ transport. Quaternaryammonium hydroxides, i.e., tetramethylammonium hydroxide (TMAOH), tetraethylammonium hydroxide (TEAOH), and tetrapropylammonium hydroxide (TPAOH), were investigated for their transport performances. Each of the quaternaryammonium hydroxides was blended with 14.8 wt % crosslinked PVA (XL-PVA) solution to obtain a coating solution with a total solids concentration of 16 wt %. The membranes were coated on the porous polysulfone substrate using the casting knife with an average dry selective layer thickness of 15 μm. The gas permeation measurements were performed at 120° C. with 54% steam on the feed side. The dry feed gas with certified composition of 59.5% $CO_2$, 26.5% $H_2$, and 14% CO was used for the transport measurements. Air with 30% steam content was used as the sweep gas. The membrane composition and transport performances are shown in Table 1. The transport performances of the membranes with TMAOH as a $CO_2$ mobile carrier, i.e., M-1 and M-2, exhibited a high $CO_2$ permeance (about 100 GPU) and a low $CO_2/H_2$ selectivity (about 20). The other membranes using TEAOH and TPAOH as $CO_2$ mobile carriers, i.e., M-3 and M-4, gave poorer performances, particularly for low $CO_2$ permeances. This example demonstrates that TMAOH can be an effective $CO_2$ mobile carrier.

TABLE 1

The performances of quaternaryammonium hydroxide-containing membranes.

| Membrane | TMAOH (wt %) | TEAOH (wt %) | TPAOH (wt %) | XL-PVA (wt %) | $CO_2$ Permeance (GPU) | $CO_2/H_2$ Selectivity |
|---|---|---|---|---|---|---|
| M-1 | 60 | 0 | 0 | 40 | 103 | 18 |
| M-2 | 50 | 0 | 0 | 50 | 93 | 21 |
| M-3 | 0 | 50 | 0 | 50 | 30 | 20 |
| M-4 | 0 | 0 | 50 | 50 | 10 | 11 |

Example 6: Quaternaryammonium Hydroxide-Containing Membranes: Synergistic Effect of TMAOH and PDADMQ-OH The quaternaryammonium hydroxide-containing polymer (PDADMQ-OH) and TMAOH were incorporated with crosslinked polyvinylalcohol-polysiloxane (XL-PVA-POS) to enhance the integrity of the polymer matrix and improve the $CO_2/H_2$ selectivity. A solution of quaternaryammonium hydroxide-containing carriers was prepared by blending the 25 wt % TMAOH with 14 wt % of PDADMQ-OH. The coating solution was prepared by blending the resultant quaternaryammonium hydroxide-containing carrier solution with a 14.8 wt % solution of crosslinked PVA-POS. The solution was coated into a thin-film on a porous polysulfone substrate to obtain an average dry selective layer thickness of 15 μm. The effect of quaternaryammonium hydroxide-containing polymer (PDADMQ-OH) on the performance of the membranes with 20 wt % TMAOH as the mobile carrier was investigated. The gas transport performance of the membrane was evaluated at 120° C. with 54% steam on the feed side and 30% steam on the sweep side. A dry feed gas with 59.5% $CO_2$, 26.5% $H_2$, and 14% CO was used along with air as the dry sweep gas for the gas transport measurements. The synergistic effect of PDADMQ-OH and TMAOH is exhibited in Table 2.

TABLE 2

The performances of quaternaryammonium hydroxide-containing membranes: the synergistic effect of TMAOH and PDADMQ-OH.

| Membrane | TMAOH (wt %) | PDADMQ-OH (wt %) | x-PVA-POS (wt %) | $CO_2$ Permeance (GPU) | $CO_2/H_2$ Selectivity |
|---|---|---|---|---|---|
| M-1 | 20 | 40 | 40 | 49 | 72 |
| M-2 | 20 | 30 | 50 | 28 | 56 |
| M-3 | 20 | 25 | 55 | 18 | 35 |
| M-4 | 20 | 16 | 64 | 13 | 21 |
| M-5 | 20 | 0 | 80 | 28 | 41 |
| M-6 | 0 | 60 | 40 | 5 | 4 |

Example 7: Quaternaryammonium Hydroxide-Containing Membranes—Optimization of TMAOH and PDADMQ-OH The membrane composition optimization of TMAOH, PDADMQ-OH, and crosslinked PVA-POS membranes was conducted. A solution of quaternaryammonium hydroxide-containing carriers was prepared by blending the 25 wt % TMAOH with the 14 wt % of PDADMQ-OH. The coating solution was prepared by blending the resultant quaternaryammonium hydroxide-containing carrier solution with a 14.8 wt % solution of crosslinked PVA-POS. The solution was coated into a thin-film on a porous polysulfone substrate to obtain an average dry selective layer film thickness of 15 μm. The gas permeation measurements were performed at 120° C. with 54% steam on the feed side and 30% steam on the sweep side. The dry feed gas with certified composition of 59.5% $CO_2$, 26.5% $H_2$, and 14% CO was used for the transport measurements along with air as the dry sweep gas. As shown in Table 3, the use of TMAOH in synergy with PDADMQ-OH enhanced $CO_2/H_2$ selectivity. Optimum performance was achieved with M-4.

TABLE 3

The performances of quaternaryammonium hydroxide-containing membranes - optimization of TMAOH and PDADMQ-OH.

| Membrane | TMAOH (wt %) | PDADMQ-OH (wt %) | x-PVA-POS (wt %) | $CO_2$ Permeance (GPU) | $CO_2/H_2$ Selectivity |
|---|---|---|---|---|---|
| M-1 | 30 | 35 | 35 | 93 | 58 |
| M-2 | 30 | 28 | 42 | 69 | 73 |
| M-3 | 25 | 37.5 | 37.5 | 69 | 69 |
| M-4 | 25 | 30 | 45 | 69 | 74 |
| M-5 | 20 | 40 | 40 | 47 | 63 |

Example 8: Quaternaryammonium Hydroxide- and Fluoride-Containing Membranes—Synergistic Effect of TMAOH and PDADMQ-F The synergistic effect of incorporating quaternaryammonium hydroxide (e.g., tetramethylammonium hydroxide (TMAOH)) and quaternaryammonium fluoride-containing polymer (e.g., PDADMQ-F) in membranes on membrane performance was investigated at 120° C. The mobile carrier (TMAOH) was blended with the fixed site carrier, fluoride-containing polymer PDADMQ-F, to form a solution containing a mixture of these two carriers, (i.e., TMAOH and PDADMQ-F). The coating solution was prepared by blending the carrier solution with the crosslinked PVA-POS solution, and then coated into a thin-film on a porous polysulfone substrate to obtain an average dry selective layer film thickness of 15 μm. Different membrane compositions were investigated for the membrane performances as shown in Table 4. As shown in this table, the membrane performances were very good for the membranes containing both TMAOH and PDADMQ-F. Also shown in this table, the membrane performances, particularly for $CO_2$ permeances, for the membranes containing XL-PVA-POS at 15% or greater were better than those without XL-PVA-POS, showing the synergistic effect due to the incorporation of XL-PVA-POS in the membrane.

TABLE 4

The performances of quaternaryammonium hydroxide- and fluoride-containing membranes - TMAOH and PDADMQ-F.

| Membrane | TMAOH (wt %) | PDADMQ-F (wt %) | XL-PVA-POS (wt %) | $CO_2$ Permeance (GPU) | $CO_2/H_2$ Selectivity |
|---|---|---|---|---|---|
| M-1 | 15 | 85 | 0 | 75 | 69 |
| M-2 | 10 | 90 | 0 | 124 | 57 |
| M-3 | 9 | 81 | 10 | 115 | 51 |
| M-4 | 7 | 78 | 15 | 290 | 66 |
| M-5 | 7.5 | 72.5 | 20 | 374 | 55 |
| M-6 | 7 | 68 | 25 | 509 | 58 |
| M-7 | 4.5 | 60.5 | 35 | 338 | 83 |
| M-8 | 4.5 | 55.5 | 40 | 140 | 108 |

Example 9: Quaternaryammonium Fluoride-Containing Membranes—Effect of TMAOH

The synergistic effect of incorporating quaternaryammonium hydroxide (e.g., tetramethylammonium hydroxide (TMAOH)) in the membranes containing quaternaryammonium fluoride-containing polymer (e.g., PDADMQ-F) on membrane performance was investigated at 120° C. The mobile carrier (TMAOH) was blended with the fixed site carrier, fluoride-containing polymer PDADMQ-F, to form a solution containing a mixture of these two carriers (i.e., TMAOH and PDADMQ-F). The coating solution was prepared by blending the carrier solution with the crosslinked PVA-POS solution, and then coated into a thin-film on a porous polysulfone substrate to obtain an average dry selective layer film thickness of 15 μm. The effect of TMAOH was investigated for the membrane performances as shown in Table 5. As shown in this table, the membrane performance, particularly for $CO_2$ permeance, for the membrane containing TMAOH was much better than that without TMAOH, showing the synergistic effect due to the incorporation of TMAOH in the membrane.

TABLE 5

The performances of quaternaryammonium fluoride-containing membranes: Effect of TMAOH.

| Membrane | TMAOH (wt %) | PDADMQ-F (wt %) | XL-PVA-POS (wt %) | $CO_2$ Permeance (GPU) | $CO_2/H_2$ Selectivity |
|---|---|---|---|---|---|
| M-1 | 0 | 70 | 30 | 55 | 60 |
| M-2 | 5 | 75 | 20 | 61 | 92 |

Figure 3:
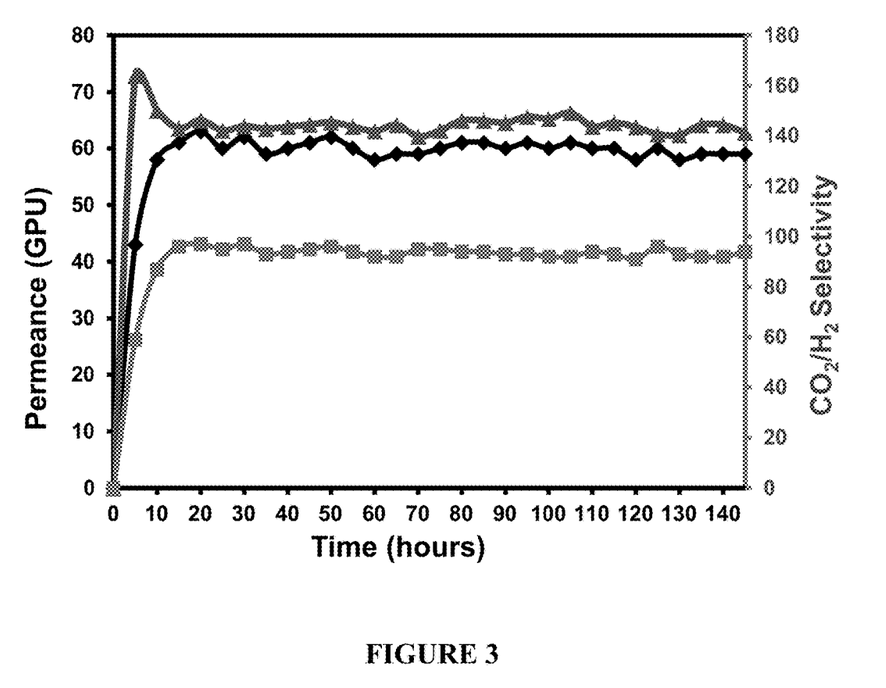
FIG. 3 is a stability plot of quaternaryammonium hydroxide- and fluoride-containing membrane containing 5% TMAOH, 75% PDADMQ-F, and 20% crosslinked PVA-POS tested at 120° C. with air as the sweep gas. The plot includes the $H_2$ permeance (×100, triangle trace), $CO_2$ permeance (diamond trace), and $CO_2/H_2$ selectivity (square trace) over time (in hours) measured for the membrane.

Example 10: Quaternaryammonium Hydroxide- and Fluoride-Containing Membranes: Stability The performance stability of the quaternaryammonium hydroxide- and fluoride-containing membranes (as in M-2 of Table 5 in Example 9) were investigated at 120° C. with air as the sweep gas at 54% steam on the feed side and 30% steam on the sweep side. The transport stability was evaluated with a certified dry feed gas composition of 59.5% $CO_2$, 26.5% $H_2$, and 14% CO; during the test, this dry feed gas was mixed with 54% steam (i.e., the dry feed gas at 46%). The membranes exhibited 145 hours of stable transport performance. The stable transport performance is shown in Table 6, and the stability plot is shown in FIG. 3.

TABLE 6

The performance of quaternaryammonium hydroxide- and fluoride-containing membrane - stability.

| Membrane | TMAOH (wt %) | PDADMQ-OH (wt %) | x-PVA-POS (wt %) | $CO_2$ Permeance (GPU) | $CO_2/H_2$ Selectivity | Test Time (hours) |
|---|---|---|---|---|---|---|
| M-1 (M-2 in Table 5) | 5 | 75 | 20 | 61 | 92 | 145 |

Figure 4:
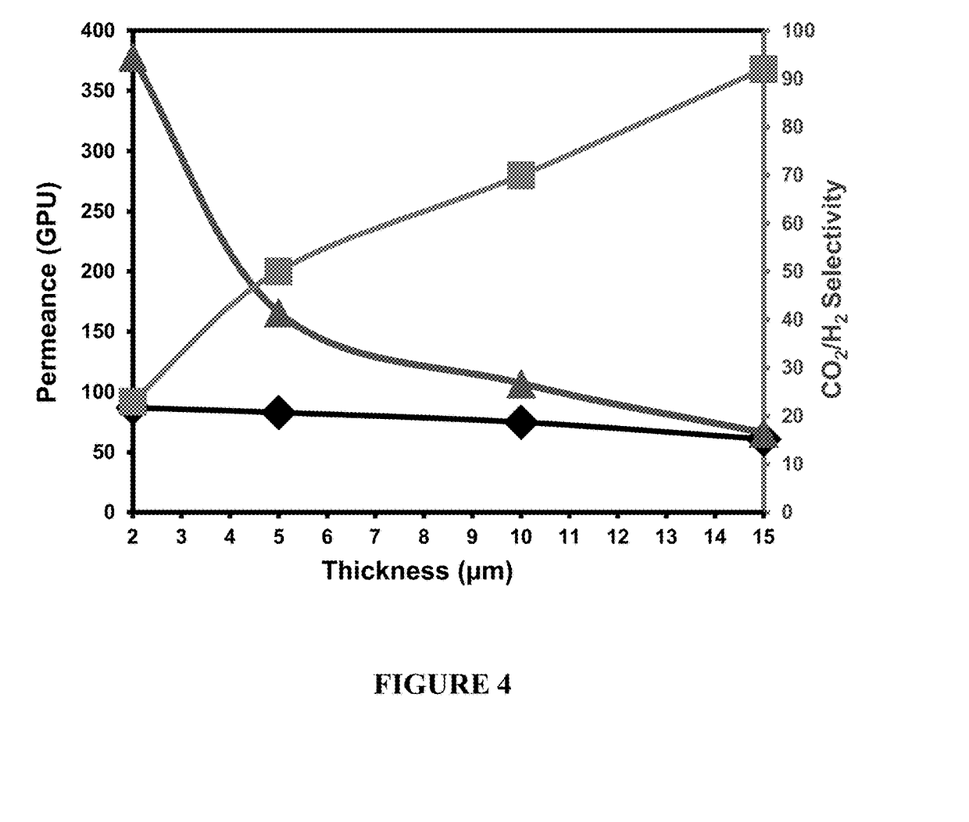
FIG. 4 is a plot showing effects of selective layer thickness on $CO_2$ permeance, $H_2$ permeance and $CO_2/H_2$ selectivity through the quaternaryammonium hydroxide- and fluoride-containing membranes with 5% TMAOH, 75% PDADMQ-F, and 20% crosslinked PVA-POS content tested at 120° C. with air as the sweep gas. The plot includes the $H_2$ permeance (×100, triangle trace), $CO_2$ permeance (diamond trace), and $CO_2/H_2$ selectivity (square trace) at various thicknesses (in microns) measured for the membrane.

Example 11: Quaternaryammonium Hydroxide- and Fluoride-Containing Membranes: Effect of Thickness The effect of the selective layer thickness was investigated at 120° C. The membrane with 5% TMAOH, 75% PDADMQ-F, and 20% x-PVA-POS (as in Example 10, i.e., as in M-2 of Table 5 in Example 9) was used for the investigation. A dry feed mixture with a certified composition of 59.5% $CO_2$, 26.5% $H_2$, and 14% CO was used and incorporated with 54% steam content on the feed side. The steam content on the sweep side was controlled at 30% with air as the dry sweep gas. Table 7 and FIG. 4 show the effect of thickness on the gas transport performance in terms of $CO_2$ permeance and $CO_2/H_2$ selectivity.

TABLE 7

The performances of quaternaryammonium hydroxide- and fluoride-containing membranes - effect of thickness.

| Membrane | Thickness (μm) | $CO_2$ Permeance (GPU) | $CO_2/H_2$ Selectivity |
|---|---|---|---|
| M-1 | 15 | 61 | 92 |
| M-2 | 10 | 75 | 70 |
| M-3 | 5 | 83 | 50 |
| M-4 | 2 | 87 | 23 |

Figure 5:
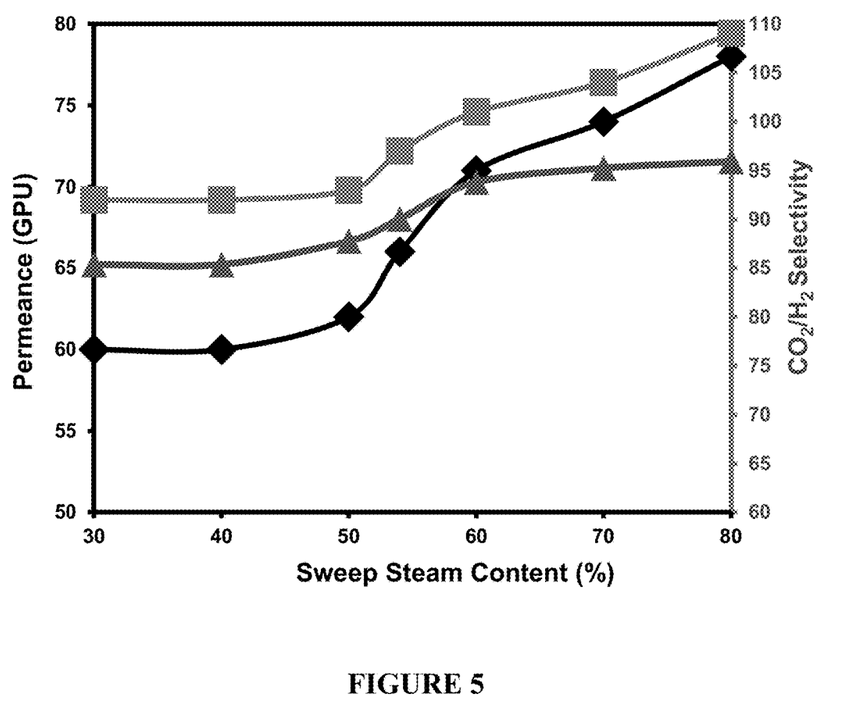
FIG. 5 is a plot demonstrating the effect of sweep steam content on $CO_2$ permeance, $H_2$ permeance and $CO_2/H_2$ selectivity for the quaternaryammonium hydroxide- and fluoride-containing membranes with 5% TMAOH, 75% PDADMQ-F, and 20% crosslinked PVA-POS tested at 120° C. with air as the sweep gas. The plot includes the $H_2$ permeance (×100, triangle trace), $CO_2$ permeance (diamond trace), and $CO_2/H_2$ selectivity (square trace) at percent steam contents of the sweep gas measured for the membrane.

Example 12: Quaternaryammonium Hydroxide- and Fluoride-Containing Membranes: Effect of Sweep Steam Content The effect of sweep steam content on the sweep side on the overall transport performance was investigated by varying the sweep steam content from 30% to 80%. The membrane with 5% TMAOH, 75% PDADMQ-F, and 20% x-PVA-POS (as in Example 10, i.e., as in M-2 of Table 5 in Example 9) was used for the investigation. The gas transport measurements were carried out at 120° C. with 54% steam content on the feed side. A dry feed mixture with a certified composition of 59.5% $CO_2$, 26.5% $H_2$, and 14% CO was used for the experiments. The effect of sweep steam content on the overall $CO_2$ and $H_2$ transport performance is shown in Table 8 and FIG. 5. As shown in Table 8 and FIG. 5, $CO_2$ permeance and $CO_2/H_2$ selectivity increased significantly for the sweep steam content of greater than 50%. Both $CO_2$ permeance and $CO_2/H_2$ selectivity increased as the sweep steam content increased.

TABLE 8

The performances of quaternaryammonium hydroxide- and fluoride-containing membranes: effect of sweep steam content.

| Membrane | Sweep Steam Content (%) | Feed Steam Content (%) | $CO_2$ Permeance (GPU) | $CO_2/H_2$ Selectivity |
|---|---|---|---|---|
| M-1 | 30 | 54 | 60 | 92 |
| M-2 | 40 | 54 | 60 | 92 |
| M-3 | 50 | 54 | 62 | 93 |
| M-4 | 54 | 54 | 66 | 97 |
| M-5 | 60 | 54 | 71 | 101 |
| M-6 | 70 | 54 | 74 | 104 |
| M-7 | 80 | 54 | 78 | 109 |

Example 13: Quaternaryammonium Hydroxide- and Fluoride-Containing Membranes at 140° C.

The performances of quaternaryammonium hydroxide- and fluoride-containing membranes for $CO_2$ transport were investigated at a higher temperature, i.e., at 140° C. The mixture of carrier solution was prepared by blending the mobile carrier (TMAOH) with the fixed site carrier, fluoride-containing polymer PDADMQ-F. The coating solution was prepared by blending the carrier solution with the crosslinked PVA-POS solution, and then coated into a thin-film on a porous polysulfone substrate to obtain an average dry selective layer film thickness of 15 μm. Different membrane compositions were investigated for the transport performances at 140° C. (54% steam in the feed side and 30% steam in the sweep side) as shown in Table 9. The $CO_2$ permeance and $CO_2/H_2$ selectivity at 140° C. were significantly enhanced by increasing the mobile carrier (TMAOH) content at the expense of the fluoride-containing polymer (PDADMQ-F).

TABLE 9

The performances of quaternaryammonium hydroxide- and fluoride-containing membranes (TMAOH and PDADMQ-F) at 140° C.

| Membrane | TMAOH (wt %) | PDADMQ-F (wt %) | x-PVA-POS (wt %) | $CO_2$ Permeance (GPU) | $CO_2/H_2$ Selectivity |
|---|---|---|---|---|---|
| M-1 | 5 | 75 | 20 | 39 | 134 |
| M-2 | 10 | 70 | 20 | 54 | 190 |
| M-3 | 15 | 65 | 20 | 71 | 220 |

Figure 6:
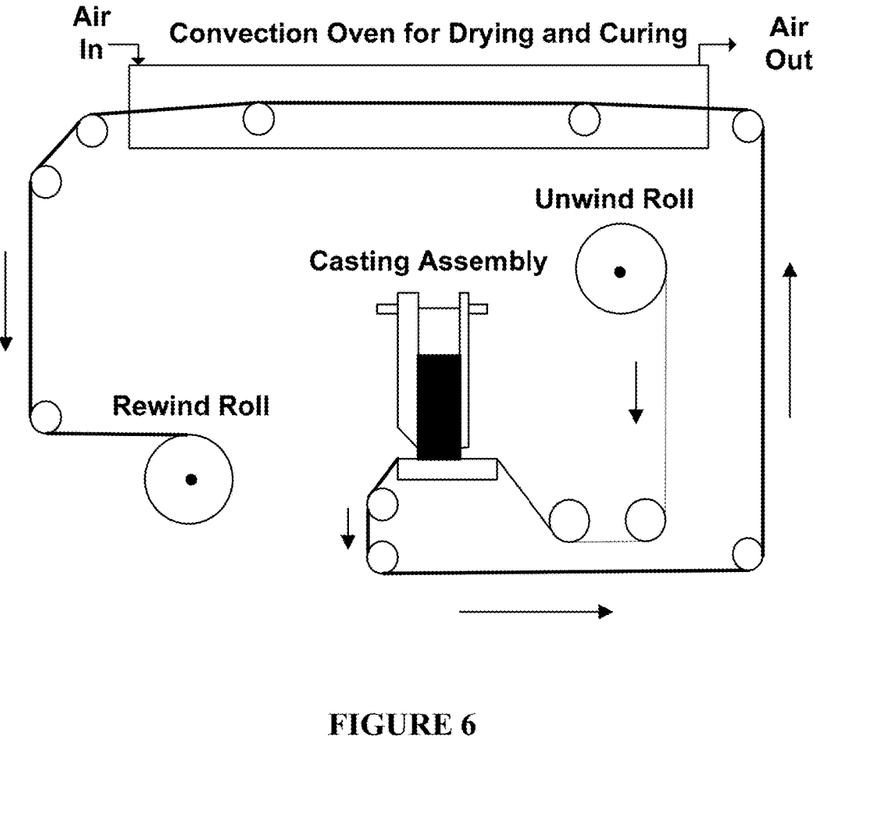
FIG. 6 is a schematic representation of a pilot-scale thin-film-coating (TFC) assembly suitable for the fabrication of the polymer membranes described herein.

Example 14: Quaternaryammonium Hydroxide- and Fluoride-Containing Membranes: Scale-Up The scale-up fabrication of the oxidatively stable quaternaryammonium hydroxide- and fluoride-containing membrane (as in Example 10, i.e., as in M-2 of Table 5 in Example 9) was demonstrated by using a pilot-scale thin-film-coating (TFC) assembly of a coating machine. The schematic representation of the thin-film casting assembly used for the pilot-scale membrane fabrication is shown in FIG. 6. The transport performance of a small representative sample (3.4 cm$^2$) taken from the 20 feet long and 14 inches wide membrane fabricated was measured by using the gas permeation measuring unit. Table 10 shows the $CO_2$ permeance and $CO_2/H_2$ selectivity results. As shown in this table, the results for the scale-up membrane (M-2) fabricated using the pilot-scale machine compared quite well with those for the lab-scale membrane (M-1).

TABLE 10

The performances of quaternaryammonium hydroxide- and fluoride-containing membranes: scale-up.

| Membrane | Fabrication Scale | Thickness (μm) | $CO_2$ Permeance (GPU) | $CO_2/H_2$ Selectivity |
|---|---|---|---|---|
| M-1 | Lab-Scale (2 in × 3 in) | 15 | 60 | 92 |
| M-2 | Scale-up (14 in × 20 ft) | 15 | 55 | 103 |

Results and Discussion

As discussed above, a disadvantage of using amines as $CO_2$ mobile and fixed carriers is the possibility of oxidation of amines, for example by $O_2$ when air is used as the sweep gas on the permeate side. This oxidation reduces membrane performance over time and rules out the use of air as the sweep gas. Membranes that include an oxidatively stable carrier (e.g., a quaternary ammonium hydroxide carrier, such as a quaternary ammonium hydroxide salt or a quaternary ammonium hydroxide-containing polymer, a quaternary ammonium fluoride carrier, such as a quaternary ammonium fluoride salt or a quaternary ammonium fluoride-containing polymer, or a combination thereof) are both oxidatively stable and effective for the selective removal of carbon dioxide and/or hydrogen sulfide from hydrogen and/or nitrogen.

Here the transport performances of the hydroxide- and fluoride-containing polymeric membranes have been investigated for $H_2$ purification. Hydroxide ions can react with $CO_2$ to form the bicarbonate ion (Reaction 1). The $CO_2$—OH reaction product (i.e., $HCO^{3-}$) can diffuse from the feed side of the membrane to the permeate side of the membrane, where it is eventually released as $CO_2$ on the permeate side (via the reversible reaction). In this way, hydroxide moieties can facilitate $CO_2$ transport by a reaction-diffusion transport mechanism, (i.e., facilitated transport).

$$OH^- + CO_2 \rightleftharpoons HCO_3^- \qquad (1)$$

Fluoride ions can similarly be used to facilitate $CO_2$ transport through membranes. Fluoride-containing salts and polymers are generally extremely hydrophilic. The acid-base reaction of fluoride ions with water molecules can generate hydroxide ions (Reaction 2). Once formed, the hydroxide ions can react with $CO_2$ (as per Reaction 1) to facilitate $CO_2$ transport across a membrane.

$$2F^- + H_2O \rightleftharpoons HF_2^- + OH^- \qquad (2)$$

Figure 1:
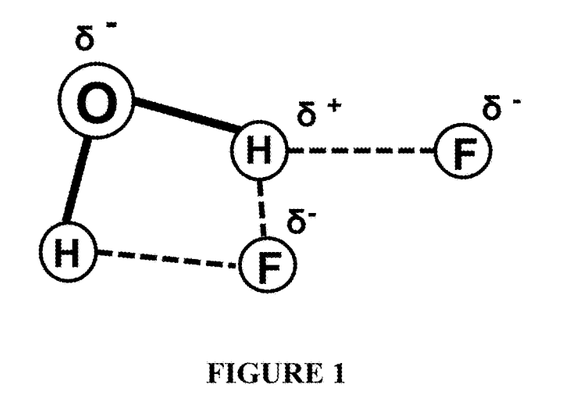
FIG. 1 is a schematic diagram illustrating the interaction between a water molecule and fluoride ions.

Fluoride ions also have a strong affinity for $H_2O$ molecules via hydrogen bonding. Thus, the presence of fluoride ions in a polymer membrane matrix can result in significant moisture retention as the ions remain solvated $[F(H_2O)_n]^-$ and are well dispersed throughout the matrix. Additionally, the hydrogen atom of a water molecule can interact strongly with fluoride ions (via strong hydrogen bonding) as shown schematically in FIG. 1 to form the $HF_2^-$ ion according to Reaction 1. Very strong hydrogen bonds (e.g., approximately 163 kJ mol$^{-1}$) can be formed between a hydrogen atom and $F_2^-$ in $HF_2^-$. The strength of such hydrogen bonds reduces as the radius of the halide ion increases. Thus, strong interactions are not observed in Cl-, Br- or I-ions.

A strong hydrogen bonding interaction with the hydrogen atom of the water molecule to the fluoride ions increases the electron density of the oxygen atom of the water molecule and the hydroxide ion. Apart from generating hydroxide ions during the $F^-$ and $H_2O$ reaction, the presence of fluoride ions makes the oxygen atom more electron rich for the $CO_2$—OH$^-$ reaction. Thus, the rate of the $CO_2$—OH$^-$ reaction is enhanced further as the oxygen atom becomes more basic for the reaction. This aids in facilitating the $CO_2$ transport through the hydroxide- and fluoride-containing membranes.

The examples above illustrate the ability of membranes including an oxidatively stable carrier (e.g., a quaternary ammonium hydroxide carrier, such as a quaternary ammonium hydroxide salt or a quaternary ammonium hydroxide-containing polymer, a quaternary ammonium fluoride carrier, such as a quaternary ammonium fluoride salt or a quaternary ammonium fluoride-containing polymer, or a combination thereof) to exhibit both oxidative stability and selective permeability. Such membranes can be used, for example, for the selective removal of carbon dioxide and/or hydrogen sulfide from hydrogen and/or nitrogen.

Examples 1, 2, 3, and 4 describe the preparation of hydroxide- and fluoride-containing quaternaryammonium polymers of polydiallyldimethylammonium hydroxide (PDADMQ-OH), polydiallyldimethylammonium fluoride (PDADMQ-F), polyvinylbenzyltrimethylammonium fluoride (PVBTQ-F), and poly(acrylamidopropyltrimethylammonium hydroxide) (PAPTQ-OH), respectively.

Example 5 shows the potential of quaternaryammonium hydroxides as mobile $CO_2$ carriers for gas separation. Example 6 illustrates the improved membrane performance due to the synergistic effect of quaternaryammonium hydroxides and quaternaryammonium hydroxide-containing polymers (a mobile and a fixed carrier) by incorporation of the quaternaryammonium hydroxide-containing polymer, poly(diallyldimethyl quaternaryammonium hydroxide) (PDADMQ-OH). Further improvement of the $CO_2/H_2$ selectivity is demonstrated in Example 7 by optimization of membrane composition. Example 8 provides the synergistic effect of incorporating both quaternaryammonium hydroxide (e.g., tetramethylammonium hydroxide (TMAOH)) and quaternaryammonium fluoride-containing polymer (e.g., PDADMQ-F) in membranes on membrane performance. Example 9 gives the synergistic effect of incorporating quaternaryammonium hydroxide (e.g., TMAOH) in the membranes containing quaternaryammonium fluoride-containing polymer (e.g., PDADMQ-F) on membrane performance.

The stability of the membrane containing quaternaryammonium hydroxide and quaternaryammonium fluoride-containing polymer is exhibited in the Example 10. As shown in FIG. 3 of Example 10, the stable performance of the membrane consisting of quaternaryammonium hydroxide and fluoride as the carriers with air as the sweep gas on the permeate side is achieved at 120° C. The effects of membrane thickness and sweep gas steam content are illustrated in Examples 11 and 12, respectively. Example 13 illustrates the effect of temperature on the quaternaryammonium hydroxide- and fluoride-containing membrane performance and compares the $CO_2$ permeance and $CO_2/H_2$ selectivity at 140° C. Example 14 describes the continuous fabrication of scale-up membrane by using the pilot-scale coating machine with the thin-film casting (TFC) assembly and the comparison of the lab-scale and scale-up membrane performances.

These examples demonstrate the effectiveness of oxidatively stable $CO_2$ carriers based on quaternaryammonium hydroxides and fluorides, enabling utilization of air as the sweep gas. The membranes disclosed in the present invention have many applications including the purification of synthesis gas to produce high-purity $H_2$, $CO_2$ removal from biogas, natural gas, shale gas, and confined space air, and $CO_2$ capture from flue gas for sequestration and enhanced oil recovery.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A membrane comprising:
   a support layer; and
   a selective polymer layer disposed on the support layer, the selective polymer layer comprising an oxidatively stable carrier dispersed within a hydrophilic polymer matrix,
   wherein the oxidatively stable carrier is selected from the group consisting of a quaternary ammonium hydroxide-containing polymer, a quaternary ammonium fluoride-containing polymer, and combinations thereof.

2. The membrane of claim 1, wherein the oxidatively stable carrier comprises a quaternary ammonium hydroxide-containing polymer.

3. The membrane of claim 2, wherein the quaternary ammonium hydroxide-containing polymer is selected from the group consisting of poly(diallyldimethyl-ammonium hydroxide), poly(vinylbenzyltrimethylammonium hydroxide), poly(2-vinyl-1-methylpyridinium hydroxide), poly(acrylamide-N-propyltrimethylammonium hydroxide), poly(2-methacryloxyethyltrimethylammonium hydroxide), poly(3-chloro-2-hydroxypropyl-2-methacryloxyethyldimethylammonium hydroxide), copolymers thereof, and blends thereof.

4. The membrane of claim 1, wherein the oxidatively stable carrier comprises a quaternary ammonium fluoride-containing polymer.

5. The membrane of claim 4, wherein the quaternary ammonium fluoride-containing polymer is selected from the group consisting of poly(diallyldimethyl-ammonium fluoride), poly(vinylbenzyltrimethylammonium fluoride), poly(2-vinyl-1-methylpyridinium fluoride), poly(acrylamide-N-propyltrimethylammonium fluoride, poly(2-methacryloxyethyltrimethylammonium fluoride), poly(3-chloro-2-hydroxypropyl-2-methacryloxyethyldimethylammonium fluoride), copolymers thereof, and blends thereof.

6. The membrane of claim 1, wherein the hydrophilic polymer matrix comprises a crosslinked hydrophilic polymer.

7. The membrane of claim 1, wherein the hydrophilic polymer matrix comprises polyvinyl alcohol.

8. The membrane of claim 1, wherein the hydrophilic polymer matrix comprises polyvinyl alcohol-polysiloxane.

9. The membrane of claim 1, wherein the support layer comprises a gas permeable polymer.

10. The membrane of claim 9, wherein the gas permeable polymer comprises a polymer selected from the group consisting of polyamides, polyimides, polypyrrolones, polyesters, sulfone-based polymers, polymeric organosilicones, fluorinated polymers, polyolefins, copolymers thereof, and blends thereof.

11. The membrane of claim 10, wherein the gas permeable polymer comprises polyethersulfone or polysulfone.

12. The membrane of claim 1, wherein the support layer comprises a gas permeable polymer disposed on a base.

13. The membrane of claim 12, wherein the base comprises a non-woven fabric.

14. The membrane of claim 13, wherein the non-woven fabric comprises fibers formed from a polyester.

15. The membrane of claim 1, wherein the membrane further comprises a permeable layer disposed between the support layer and the selective polymer layer.

16. The membrane of claim 15, wherein the permeable layer comprises a gas permeable polymer is selected from the group consisting of poly(dimethylsiloxane), poly(trimethylsilylpropyne), poly(4-methyl-1-pentene), copolymers thereof, and blends thereof.

17. The membrane of claim 1, wherein the membrane further comprises a permeable layer disposed on the selective polymer layer.

18. The membrane of claim 17, wherein the permeable layer comprises a gas permeable polymer is selected from the group consisting of poly(dimethylsiloxane), poly(trimethylsilylpropyne), poly(4-methyl-1-pentene), copolymers thereof, and blends thereof.

19. The membrane of claim 1, wherein the membrane is configured in a flat sheet, a spiral-wound, a hollow fiber, or a plate-and-frame configuration.

20. A method for separating a first gas from a feed gas stream, the method comprising contacting a membrane defined by claim 1 with the feed gas stream comprising the first gas under conditions effective to afford transmembrane permeation of the first gas.

21. The method of claim 20, wherein the feed gas comprises hydrogen, carbon dioxide, hydrogen sulfide, hydrogen chloride, carbon monoxide, nitrogen, methane, steam, sulphur oxides, nitrogen oxides, or combinations thereof.

22. The method of claim 21, wherein the first gas is chosen from carbon dioxide, hydrogen sulfide, hydrogen chloride, and combinations thereof.

23. The method of claim 20, wherein the first gas exhibits a permeance of at least 50 GPU at 120° C.

24. The method of claim 23, wherein the first gas exhibits a permeance of from 50 GPU to 500 GPU at 120° C.

25. The method of claim 24, wherein the first gas exhibits a permeance of from 50 GPU to 250 GPU at 120° C.

26. The method of claim 20, wherein the feed gas comprises a second gas selected from the group consisting of nitrogen, hydrogen, carbon monoxide, and combinations thereof, and
wherein the membrane exhibits a first gas:second gas selectivity of from 20 to 250 at 120° C.

27. The method of claim 20, wherein the membrane comprises a feed face and a permeate face, and the method further comprises applying a vacuum to the permeate face of the membrane to remove the first gas.

28. The method of claim 20, wherein the membrane comprises a feed face and a permeate face, and the method further comprises flowing a sweep gas across the permeate face of the membrane to remove the first gas.

29. The method of claim 28, wherein the sweep gas comprises air.

30. The method of claim 20, wherein the feed gas has a temperature of at least 100° C.

31. A method of making a membrane comprising depositing a selective polymer layer on a support layer, the selective polymer layer comprising an oxidatively stable carrier dispersed within a hydrophilic polymer matrix,
wherein the oxidatively stable carrier is selected from the group consisting of a quaternary ammonium hydroxide-containing polymer, a quaternary ammonium fluoride-containing polymer, and combinations thereof.

* * * * *